No. 790,059. PATENTED MAY 16, 1905.
C. W. HOWLAND.
INSTRUMENT FOR CENTERING, MARKING, AND TESTING LENSES.
APPLICATION FILED SEPT. 26, 1904.
4 SHEETS—SHEET 1.
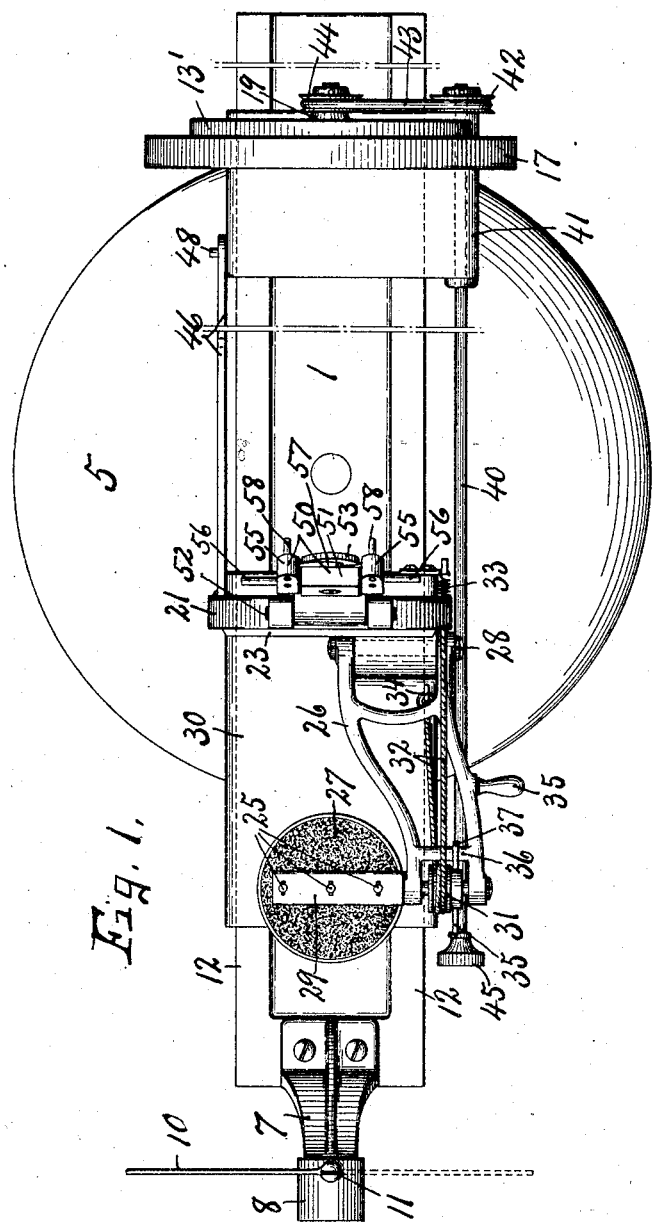
WITNESSES:
B. E. Robinson
C. Hisington,
INVENTOR:
Chauncey W. Howland,
BY:
Howard P. Denison
ATTORNEY.

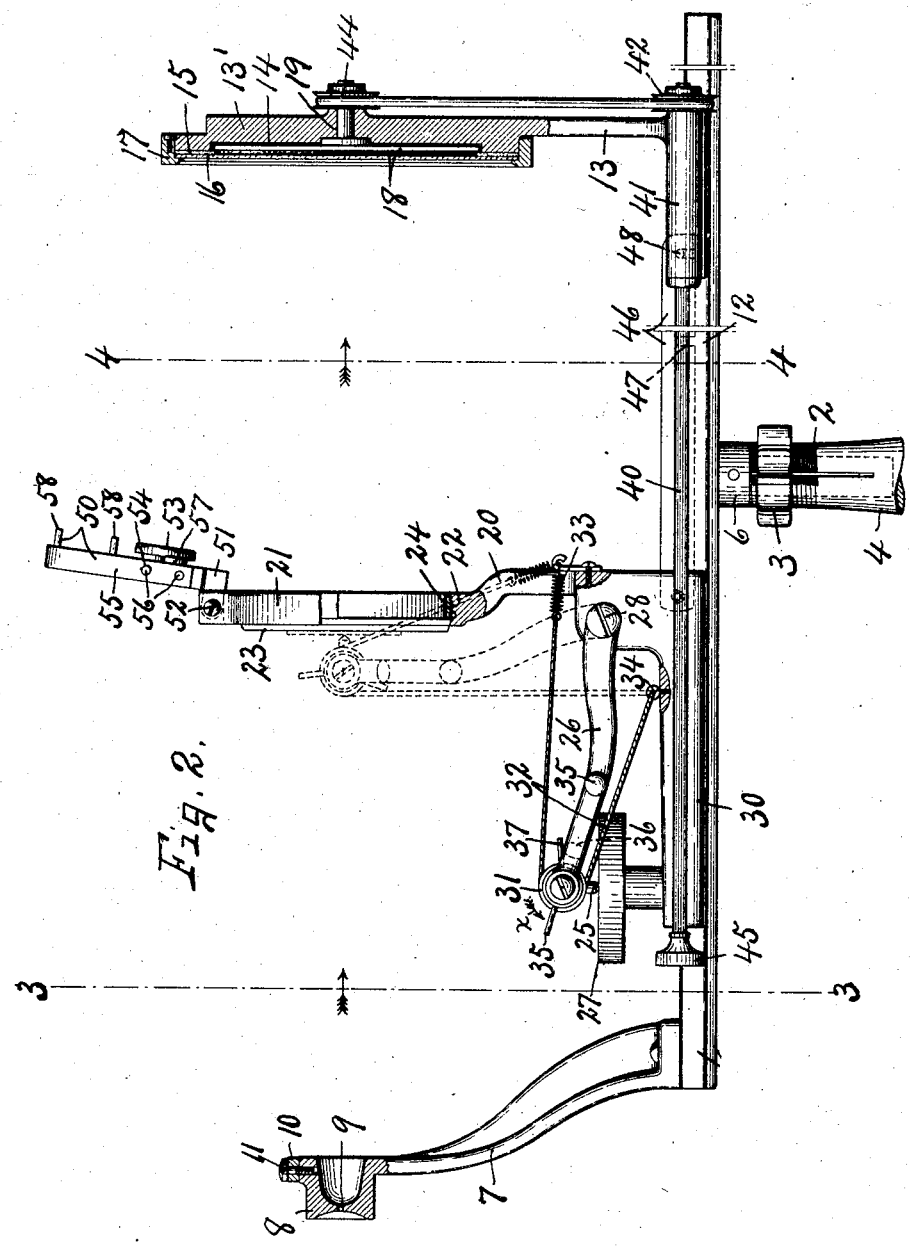

No. 790,059. PATENTED MAY 16, 1905.
C. W. HOWLAND.
INSTRUMENT FOR CENTERING, MARKING, AND TESTING LENSES.
APPLICATION FILED SEPT. 26, 1904.
4 SHEETS—SHEET 3.
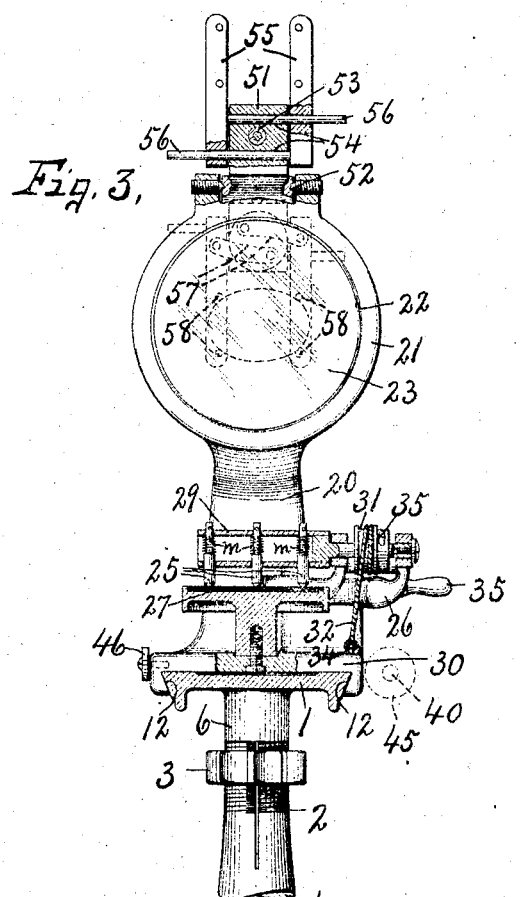
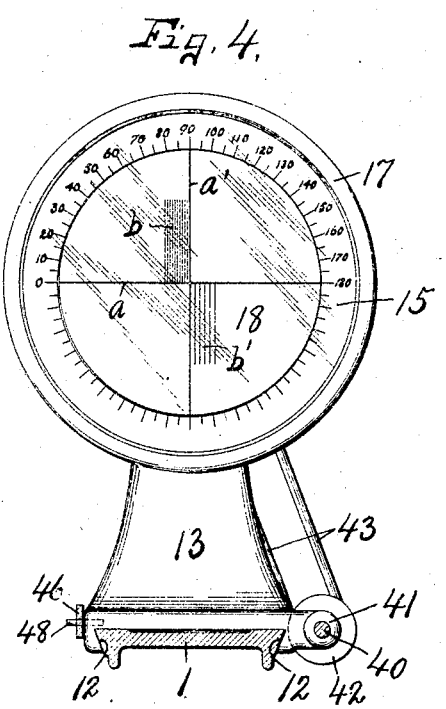
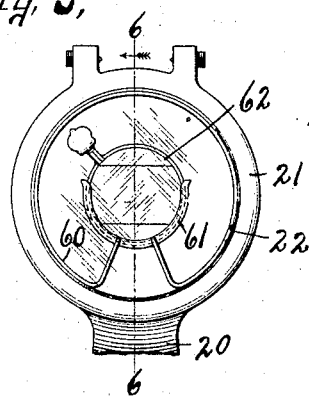
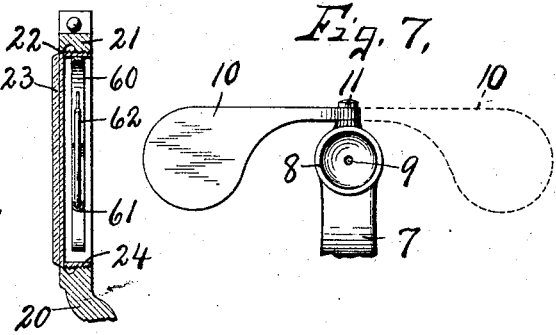
WITNESSES:
B. E. Robinson
C. Hisington
INVENTOR:
Chauncey W. Howland,
BY:
Howard P. Denison
ATTORNEY.

No. 790,059. PATENTED MAY 16, 1905.
C. W. HOWLAND.
INSTRUMENT FOR CENTERING, MARKING, AND TESTING LENSES.
APPLICATION FILED SEPT. 26, 1904.
4 SHEETS—SHEET 4.
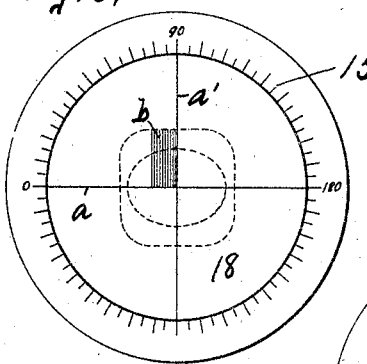
Fig. 8.
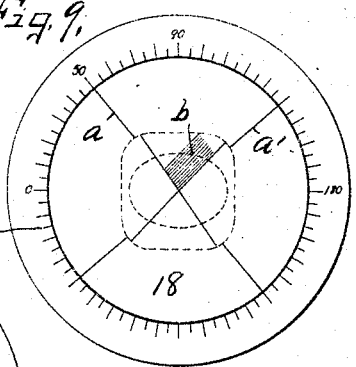
Fig. 9.
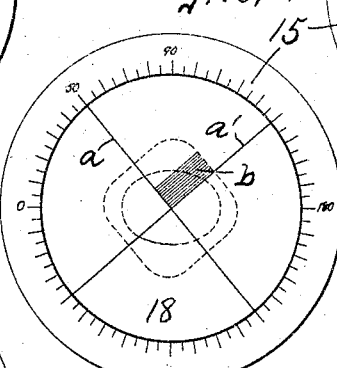
Fig. 10.
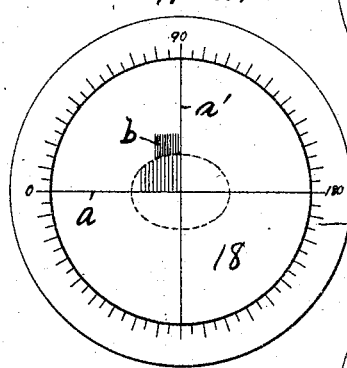
Fig. 12.
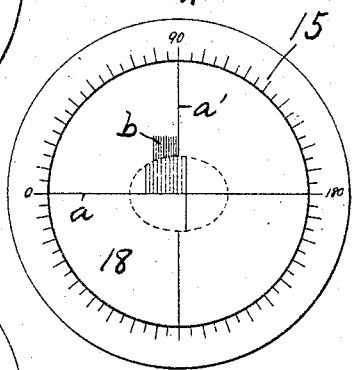
Fig. 13.
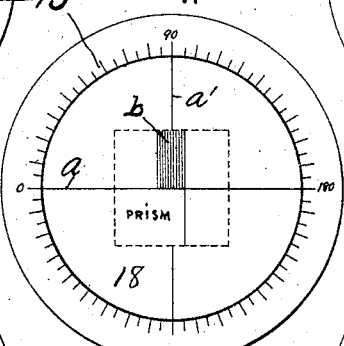
Fig. 11.
Fig. 14.
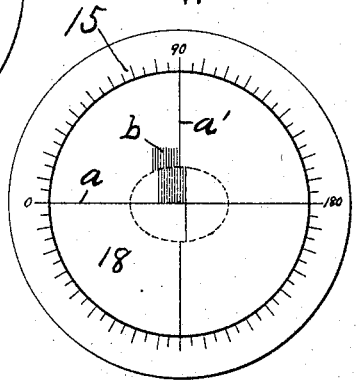
Fig. 15.
WITNESSES:
B. E. Robinson.
C. Hisington.
INVENTOR:
Chauncy W. Howland,
BY:
Howard P. Denison
ATTORNEY.

No. 790,059.

Patented May 16, 1905.

UNITED STATES PATENT OFFICE.

CHAUNCEY W. HOWLAND, OF GENEVA, NEW YORK, ASSIGNOR TO THE STANDARD OPTICAL COMPANY, OF GENEVA, NEW YORK, A CORPORATION OF NEW YORK.

INSTRUMENT FOR CENTERING, MARKING, AND TESTING LENSES.

SPECIFICATION forming part of Letters Patent No. 790,059, dated May 16, 1905.

Application filed September 26, 1904. Serial No. 225,964.

*To all whom it may concern:*

Be it known that I, CHAUNCEY W. HOWLAND, of Geneva, in the county of Ontario, in the State of New York, have invented new and useful Improvements in Instruments for Centering, Marking, and Testing Lenses, of which the following, taken in connection with the accompanying drawings, is a full, clear, and exact description.

This invention relates to an instrument for centering, marking, and testing lenses, and is therefore adapted for use in the manufacture, cutting, and mounting of lenses and also in selection of lenses for certain prescriptions and in verifying the accuracy of mounted lenses.

The primary object is to simplify this class of work and at the same time to reduce the liability of error in marking preparatory to cutting and setting the lenses and also to enable the manufacturer, optician, or oculist to readily test the accuracy of any lens.

One of the special objects is to provide a mechanical marker operable manually and capable of producing three points in the major axis of the lens, one of which points determines the optical center of the lens.

Another object of special importance is to enable the operator to readily determine or test the power or value of prisms or prismatic lenses by means of parallel lines on the target representing degrees of prism-power, which also serve as a means by which any spherical, cylindrical, or sphero-cylindrical lens may be accurately decentered.

Other objects and uses will be brought out in the following description.

In the drawings, Figure 1 is a top plan of an instrument embodying features of my invention. Fig. 2 is a side elevation, partly in section, of the upper portion of the device seen in Fig. 1. Figs. 3 and 4 are sectional views taken, respectively, on lines 3 3 and 4 4, Fig. 2, showing parts of the ink-pad and marker and also portions of the lens-centering device in section. Fig. 5 is a face view of the transparent lens rest and holder for the lens-tester. Fig. 6 is a sectional view taken on line 6 6, Fig. 5. Fig. 7 is an end view of the sight-tube and blinder attached thereto. Figs. 8 to 15, inclusive, are similar views of the rotary cross-line target and its protractor-scale, showing its uses.

In carrying out the objects stated a horizontally-disposed bed 1 is clamped, by means of a split hub 2 and nut 3, to the upper end of an upright standard 4, which has a comparatively broad flat base 5 to properly support the superimposed parts.

The split hub 2 constitutes the upper end of the standard 4 and is threaded to receive the nut 3, and the bed 1 has a depending stud or shaft 6, which enters the split hub and forms the pivotal bearing upon which the bed may be rotated or adjusted horizontally with reference to the standard 4, but may be rigidly held from rotation by tightening the nut 3.

An upright bracket 7 is secured to and rises from what may be termed the "front" end of the bed 1 and is provided at its upper end with a sight-tube 8, which is located some distance above the bed and has a small sight-opening 9, having its axis parallel with the upper face of the bed.

A blinder or shutter 10 is pivoted at 11 to the top wall of the tube 8 and is free to swing horizontally to either the right or left side of the tube, Fig. 7, according to which eye is used at the sight-opening, so as to shut off the view of the other eye without closing it.

The bed 1 is preferably dovetail in cross-section to form parallel ways 12, and upon the rear end of this bed is mounted an upright bracket 13, having a dovetail recess in its base to receive the ways 12 and permit the bracket to be moved toward and from the sight-tube without liability of displacement except at the ends of the bed.

The upper part of the bracket 13 is made in the form of a circular disk 13', having a concentric annular recess 14 and a circular protractor-scale 15, both of which face the sight-tube 8 and are covered by a plain transparent glass plate 16, which is held in place by a suitable bezel 17, as best seen in Fig. 2, the protractor-scale having its axis or center coincident with the axis of the sight-opening 9 and is graduated from "0°" to "180°" from a horizontal line passing through its center to enable the operator to read the angle or degree of inclination of the optical axis of a lens from its horizontal or geometrical axis.

A target 18 is journaled in a suitable bearing 19 in the disk 13' to rotate in the recess 14 with its axis coincident with that of the protractor and sight-opening and has its front face in a plane coincident with the face of the protractor. This target is provided with cross-lines $a$ and $a'$, which are disposed at right angles to each other and intersect at the center or axis of the protractor to determine the optical centers and axes of lenses which are interposed in the line of vision between the sight-tube and target, the point of intersection of said lines being the optical center of the lens.

In order to obtain or test the prismatic power of lenses and also to enable the operator to readily decenter a lens, the front face of the target is provided with separate series $b$ and $b'$ of parallel lines, those of the series $b$ being shown in Fig. 4 as spaced equidistant apart above the horizontal line and parallel with the line $a'$ to represent the units or degrees of prism-power at a fixed distance from the lens, while those of the series $b'$ are spaced equidistant apart below the line $a$, but parallel with the line $a'$, and represent two units or degrees of prism-power at the same fixed distance from the lens. It follows, of course, that at one-half the distance from the lens series $b'$ will represent units or degrees of prism-power and series $b$ half units or degrees.

Secured to the bed 1 and rising therefrom between the sight-tube and target is a third bracket 20, having a circular top portion 21, which is formed with a central circular opening 22, having its axis coincident with that of the sight-opening 9 and target 18. In this opening 22 is secured a plain transparent glass 23 and a suitable annulus 24, which engages the edges of the glass to hold it in place with its front face at right angles to its axis and parallel with the face of the target.

In testing the lens it is held by hand or otherwise against the front face of the glass plate 23 with the same side toward the eye as when mounted in its frame for use, and if it is a spherical, cylindrical, or sphero-cylindrical lens it is moved or rotated until the optical axis and optical center are made to coincide, respectively, with the cross-lines inside and outside of the perimeter of the lens and with the point of intersection of said lines. When the visual aberration is thus neutralized, suitable marks are made on the lens, one at the optical center or point of intersection of the cross-lines and one at each side on the major axis coincident with a horizontal line running from "0°" to "180°" on the protractor-scale 15.

The means for marking the lens preferably consists of three inking-points 25, carried by a swinging frame 26, which is movable by hand or otherwise to alternately bring said points into contact with an inking-pad 27 and then with the lens while it is still held optically centered against the glass plate 23. The frame 26 is pivotally mounted at 28 upon the bracket 20 below the glass plate 23 and between said plate and the sight-tube and is provided with a revolving shaft 29, which is disposed at right angles to the axis of the sight-opening and in which the inking-points 25 are yieldingly mounted, as best seen in Fig. 3.

The inking-pad 27 is disposed in a horizontal plane upon a forward extension or foot 30 of the bracket 20 between the glass plate 23 and sight-tube, and in marking the lens the inking-pins 25 are rocked from a substantially vertical position on the top of the pad 27 to a substantially horizontal position against the front face of the lens. In order to accomplish this rocking movement of the pins, the shaft 29 is provided with a drum 31, around which is wound a cable 32, having one end connected to a spring-anchor 33 above and at the rear of the pivot 28 and its other end connected to an anchor 34 in front of and below said pivot, so that as the operator rocks the frame upwardly by means of a handle 35 from the position shown by full lines, Fig. 2, to that shown by dotted lines the tension of the cable 32 upon the drum causes said drum to rotate a quarter-turn in the direction indicated by arrow $x$.

The amount of rotation of the shaft and inking-fingers during the upward swing of the carriage 26 is limited by a suitable stop-finger 35' on the shaft which engages a suitable stop-bar 36 on the carriage 26, the ink-points 25 and frame being so adjusted and fitted that the points of the fingers all strike the lens in the same straight line coincident with the horizontal major axis of the lens.

In returning the carriage 26 to its normal position the cable 32 operates to reverse the direction of rotation of the drum, which is limited by a second stop-finger 37 engaging the opposite face of the stop-bar 36.

The anchors 33 and 34 are preferably secured to the bracket 20, and the spring-anchor 33 serves to take up any slack in the cable, so as to insure a positive friction grip upon the drum to rotate the shaft as the carriage 26 is rocked in reverse directions. The bracket 20 also has a dovetail recess in its lower face fitting upon the bed 1 and may be moved along the bed, if desired; but it is preferably secured to the bed by suitable means (not shown) when properly adjusted with reference to the sight-tube. The target-carriage is, however, adjustable along the bed to conform to the focus of the lens which is being tested or marked, and for this purpose I provide the base of the bracket with a suitable push-and-pull rod 40, which extends forwardly along one side of the bed within easy reaching distance of the operator when looking through the sight-tube. This rod, however, has another function—viz., to rotate the target—and its rear end is therefore journaled in a suitable bearing 41 on the base of the target-carriage and is provided with a pulley 42, which is connected by a belt 43 to a second pulley 44 on the target-shaft.

The front end of the rod 40 is provided with a suitable knob 45, by which the rod may be turned by one hand of the operator while the other is holding the lens against the plate 23, and in order to hold the target-carriage at a fixed distance from the lens when decentering or testing prismatic power I provide a link 46, which is pivoted at one end to the bracket 20, and its opposite end is formed with one or more notches or recesses 47, which engage a suitable pin 48 on the side of the target-carriage.

A large majority of all cylindrical and sphero-cylindrical lenses are prescribed with the cylindrical axis vertically at axis ninety degrees or horizontally at axis one hundred and eighty degrees, as shown in the protractor-scale in Fig. 4. Now suppose it is desired to mark a cylindrical lens preparatory to cutting and mounting the same with its optical axis at an angle of one hundred and eighty degrees. The target is first set by means of the rod 40 so that one of the cross-lines is disposed horizontally with one end at "0°" and its other end at "180°," as indicated on the protractor-scale. (Seen in Figs. 4 and 8.) Then place the uncut cylindrical lens against the glass plate 23, with the eye side toward the sight-tube, and then look through the sight-opening onto the cross-lines of the target and move the lens until it is correctly centered with reference to the cross-lines and hold it in this position with one hand. If the cross-lines appear continuous both within and without the lens, as shown in Fig. 8, the lens is correctly centered. The same is true if the cross-lines are turned to any other axis, as shown in Fig. 10, where it is placed at "50°."

If the cross-lines appear broken, as shown in Fig. 9, then rotate the lens until the aberration is corrected, as in Fig. 10, and hold it in this position by one hand and with the other hand swing the carriage 26 upward until the inking-pins strike and mark the lens, which indicates the horizontal axis and optical center and enables the lens to be properly placed in the cutting-machine and accurately cut.

If it is desired to obtain the power of any prism, the bracket 13 is drawn toward the bracket 20, and the notch 47 in the link 46 is engaged with the pin 48. The lens is then simply placed by hand against the glass plate 23, as seen in Fig. 11, and by looking through the sight-tube it will be seen that one of the cross-lines, as the vertical line, appears broken and the amount of refraction or offset of the part of the line seen within the lens will be indicated by a number of spaces—in this instance 5—to the right of the vertical line, and as each space represents one millimeter or one degree of prism-power the power of this prism is five degrees with the base to the left.

If the bracket 13 were held twice the distance from the target 20, the same lines would indicate half-degrees of prismatic power, and lines spaced at twice the distance apart would show whole degrees. We provide two sets of lines for this purpose, as shown in Fig. 4, and two notches on the link 46, so that, if desired, half-degrees can be measured.

In centering a spherical lens place the lens against the glass plate 23, so that the cross-lines appear continuous, and where the lines intersect is the optical center, as seen in Fig. 12, which is a 4.50 P. C. X. lens. In order to decenter this same lens—say two degrees—it is simply necessary to move it to the left, as in Fig. 13, until the vertical line appears broken, and the part of the line seen through the lens is displaced to the right two millimeters.

In Fig. 14 I have shown a 1.75 P. C. C. lens optically centered, and in Fig. 15 the same lens decentered one degree.

In testing cut lenses I preferably employ a device 50, Figs. 1, 2, and 3, for mechanically centering the lens with reference to the point of intersection of the cross-lines $a\ a'$. This device consists of an arm 51, hinged at 52 to the top of the bracket 20 above the glass plate 23 and provided with a revoluble handpiece 53 and guide-openings 54 at opposite sides of the handpiece 53. Parallel bars 55 are arranged at opposite sides of the arm 50 and are each provided with a guide-stem 56, movable in their respective apertures 54. These bars 55 are eccentrically connected by links 57 to the rotary handpiece 53 and are each provided with a pair of centering-pins 58, which are arranged so as to grip the edges of the lens and hold it with its optical center in line with the axis of the target, as shown by dotted lines in Fig. 3, said centering device being adapted to be swung up to the position shown by full lines in Figs. 1, 2, and 3.

It is sometimes necessary to employ neutralizing-lenses in decentering certain other lenses and in other connections, and for this purpose I have shown a ring 60, Figs. 5 and 6, as provided with a grooved form-receiver 61, in which is shown a lens-form 62.

It will be observed that the marking-pins are yieldingly held in the shaft 29 by springs $m$, and the object of this is to compensate for inequalities in the amount of projection of different parts of the surface of the lens which is being marked, so that all of the pins may produce the desired effect.

It will be observed upon reference to the drawings that the glass plate or lens-rest 23 is free from lines or other marks and that the optical centers and axes of the lenses are determined solely by the protractor-scale 15, as used in conjunction with the cross-lines of the target 18.

The operation of my invention is now believed to be sufficiently clear to enable any one skilled in this art to construct and operate the device, and although I have only described certain uses for which the instrument is adapted, such as determining the optical centers of spherical or compound lenses and the optical axes of cylindrical prismatic or compound lenses, and also for locating and marking the horizontal line or major axis upon which the lens is to be cut and set, also for locating the optical center and angle at which a lens may have been set in its frame or mounting, it is apparent that it may be adapted for various other uses in this art, and therefore I do not wish to restrict myself to the particular uses described nor to the exact construction shown.

Having thus fully described my invention, what I claim, and desire to secure by Letters Patent, is—

1. In an instrument for centering, marking and testing lenses, the combination with a cross-line target and protractor-scale, of a transparent plate in front of the target, and a mechanical marker having three marking-points movable toward and from said plate.

2. In an instrument for centering, marking and testing lenses, the combination with a target and protractor-scale for the purpose described, of manual means operatively connected to rotate the target, a transparent plate in front of the target against which the lens is adapted to be placed, and mechanical means for marking the optical center of the lens.

3. In an instrument for centering, marking and testing lenses, the combination with a transparent lens-rest, a bracket movable toward and from the lens-rest and provided with a rotary target and protractor-scale for the purpose described, and a handpiece operatively connected to move the bracket endwise and having independent connection with the target to rotate the same.

4. In an instrument for centering, marking and testing lenses, the combination with a target, a transparent lens-rest in front of the target and a sight-tube in front of the lens-rest, of a marking device operable manually toward and from the lens-rest, said device having three marking-points in the same straight line for the purpose described.

5. In an instrument for centering, marking and testing lenses, the combination with a circular protractor-scale and a rotary target concentric with said scale and having cross-lines thereon for the purpose described, of a bracket in front of the target and protractor-scale, and a lens-centering device mounted upon said bracket for supporting a lens with its optical center in the axis of the rotation of the target.

6. In an instrument for centering, marking and testing lenses, the combination with a rotary target and a circular protractor-scale concentric with said target, means to rotate the target, a support in front of the target and a lens-centering device mounted upon the support and having opposite pairs of pins for engaging the periphery of the lens and centering said lens with its optical center coincident with the axis of the target.

7. In an instrument for centering, marking and testing lenses, the combination with a transparent lens-rest, of a rotary target and a protractor-scale concentric with the target, said target having cross-lines intersecting at the axis of the rotation and also having a series of lines spaced equidistant apart parallel with and at one side of one of the cross-lines for the purpose set forth.

8. In an instrument for centering, marking and testing lenses, the combination with a lens-rest, of a mechanical marking device operable manually to and from the lens-rest and having three marking-points in a direct line to mark the horizontal axis and the center of the lens.

9. In an instrument for centering, marking and testing lenses, a transparent lens-rest and a sight-tube, in combination with an ink-pad and a carriage having marking-points and operable manually to first contact the points with the ink-pad and then with the lens on the lens-rest.

10. In an instrument for centering, marking and testing lenses, a lens-marking device comprising an ink-pad, a swinging carriage operable manually, a rock-shaft on the carriage, means connected to rock said shaft as the carriage is operated, and a marking-pin on the rock-shaft movable into and out of engagement with the inking-pad as the carriage is rocked.

11. In an instrument for centering, marking and testing lenses, a lens-marking device comprising an ink-pad, a vertically-swinging carriage operable manually, a rock-shaft on the carriage and provided with three marking-points in the same straight line movable into and out of contact with the inking-pad as the carriage is rocked and means to rock said shaft as the carriage is moved.

12. In an instrument for centering, marking and testing lenses, the combination with a transparent lens-rest and a cross-line target at the rear of the lens-rest, opposite pairs of centering-pins and supports therefor movable toward and from each other and movable to and from a position in front of the lens-rest, and means for moving said supports toward and from each other in parallel lines.

13. In an instrument for centering, marking and testing lenses, the combination of a lens-rest, a sight-tube in front of the lens-rest, a target and protractor-scale at the rear of the lens-rest, a support for said target and protractor movable toward and from the lens-rest, means for moving said support and additional means for locking it in its adjusted position.

14. In an instrument for centering, marking and testing lenses, the combination with a rotary target having cross-lines thereon and a protractor-scale concentric with the target, of a transparent lens-rest in front of the target, a support for the lens-rest and a removable lens-form holder mounted on said support at the rear of the lens-rest for the purpose described.

15. In an instrument for centering, marking and testing lenses, the combination with a horizontally-disposed bed, of a sight-tube, lens-rest and target all mounted on the bed, a circular protractor-scale concentric with the target, mechanism operable manually and connected to rotate the target, and a mechanical marking device also operable manually to mark the optical center and axis of the lens.

16. In an instrument for centering, marking and testing lenses, the combination of a rotary target having cross-lines thereon, manually-operable means connected to rotate the target, a circular protractor-scale concentric with the target, a sight-tube, a transparent lens-rest between the sight-tube and target, an inking-pad, and a marking device movable between the inking-pad and lens-rest and provided with three yielding marking-points in the same straight line contacting with the pad and then with the lens as the marking device is moved.

In witness whereof I have hereunto set my hand on this 23d day of September, 1904.

CHAUNCEY W. HOWLAND.

Witnesses:
F. S. BRONSON,
LEWIS W. KEYES.